(12) United States Patent
Tönjes et al.

(10) Patent No.: US 7,558,262 B2
(45) Date of Patent: Jul. 7, 2009

(54) GROUP HOPPING AND CHANNEL ZAPPING DURING TRANSMISSION OF MULTICAST APPLICATIONS

(75) Inventors: Ralf Tönjes, Osnabrück (DE); Ralf Keller, Wurselen (DE); Thorsten Lohmar, Aachen (DE); Frank Hundscheidt, Kerkrade (NL)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 387 days.

(21) Appl. No.: 10/532,323

(22) PCT Filed: Nov. 29, 2002

(86) PCT No.: PCT/EP02/13506

§ 371 (c)(1),
(2), (4) Date: May 18, 2006

(87) PCT Pub. No.: WO2004/051926

PCT Pub. Date: Jun. 17, 2004

(65) Prior Publication Data

US 2006/0268873 A1    Nov. 30, 2006

(51) Int. Cl.
*H04L 12/56* (2006.01)
(52) U.S. Cl. .................................. 370/390; 370/432
(58) Field of Classification Search ................. 370/390, 370/432, 465; 713/163
See application file for complete search history.

(56) References Cited

U.S. PATENT DOCUMENTS 6,453,438 B1    9/2002    Cates et al.
6,826,612 B1 *  11/2004   Bosloy et al. ............... 709/227
7,181,526 B1 *  2/2007    Bell et al. .................... 709/231
2003/0100325 A1 * 5/2003  Paila et al. .................. 455/506
2004/0062264 A1 * 4/2004  Adams ........................ 370/432
2007/0110248 A1 * 5/2007  Li .............................. 380/278

FOREIGN PATENT DOCUMENTS

WO    WO 00 33535 A    6/2000
WO    WO 00 79734 A    12/2000

OTHER PUBLICATIONS

Swan A et al, "Layered Transmission and Caching for the Multicast Session Directory Service", Proceedings of the ACM Multimedia 98. MM '98, Bristol, Sep. 12-16, 1998, aCM International Multimedia Conference, New York, NY: ACM, US, vol. Conf. 6, Sep. 12, 1998, pp. 119-128, XP000977496, ISBN: 1-58113-036-8.
European Patent Office, International Search Report for PCT/EP02/13506, dated Aug. 12, 2003.

* cited by examiner

*Primary Examiner*—Min Jung
(74) *Attorney, Agent, or Firm*—Roger S. Burleigh

(57) ABSTRACT

The invention relates to a method for performing a flexible multicast of multicast data to a multicast group within a telecommunication system wherein the multicast data is provided by a broadcast/multicast server and transferred to the users registered to the multicast group by means of channels. In the invention multi-channel multicast groups (B1,B2, ... ) are provided. Each multi-channel multicast group offers at least one channel wherein a channel transports content. The availability and configuration of the multi-channel multicast group is announced to the users by means of an announcement multicast group (A). The user either initiates the changing to an announced multi channel multicast group or the user is forced by the operator to change in case the operator wants to control the allocation of resources.

18 Claims, 1 Drawing Sheet

GROUP HOPPING AND CHANNEL ZAPPING DURING TRANSMISSION OF MULTICAST APPLICATIONS

TECHNICAL FIELD OF THE INVENTION

Figure 1:
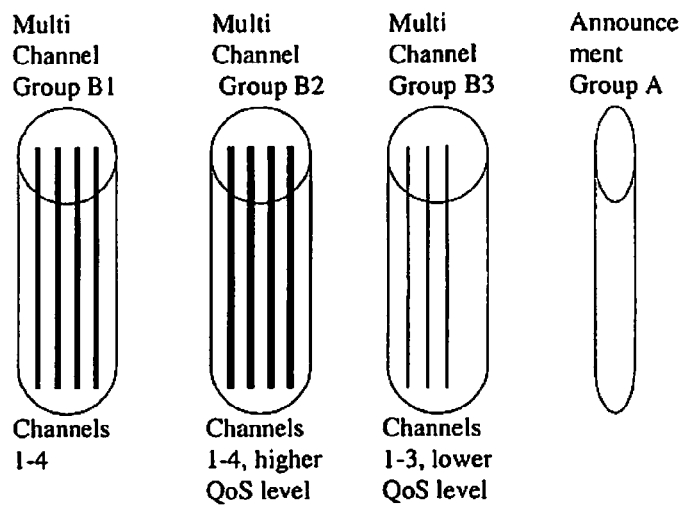

The present invention relates to a method, a system and a receiver for performing group hopping and channel zapping during transmission of multicast applications in a telecommunication network.

Especially the present application is applicable in a wireless packet-switched telecommunication network.

BACKGROUND

Universal Mobile Telecommunication System UMTS is being developed to offer wireless wideband multimedia service using Internet protocol. The UMTS as a third-generation 3G mobile communication system combines among others streaming with a range of unique services to provide high-quality Internet content to the mobile users. Images, voice, audio and video content are example of mobile multimedia services, which are delivered to the users via media streaming techniques. It means once the content has been put onto a media server, it can be delivered for example via streaming to the end users.

The streaming service in a wireless network is provided both to a single user by means of the so-called unicast connections and to a group of users by means of the so-called point-to-multipoint or even multipoint-to-multipoint communication. The point-to-multipoint services pose high demands on the network infrastructure and may consume considerable amounts of bandwidth. Some examples of such services are video-conferencing, whiteboarding, real-time multi-user games, multimedia messaging, virtual worlds. This kind of point-to-multipoint applications use broadcast or multicast mode for transmission. Broadcast has the possibility of addressing a packet to all destinations like to every user on the network. Multicasting supports transmission to a group of the users in the network. Each user can register to a multicast group. When a packet is sent to a certain group, it is delivered to all users registered to that group. Multicasting is a service that permits sources to send a single copy of the same data to an address that causes the data to be delivered to multiple recipients. Under multicasting and broadcasting only one copy of a message passes over any link in a network and copies of the message are made only where paths diverge. In the following description the multicast is taken as an example. The application is applicable also to the broadcast applications.

A server in the IP network provides the multicast service. The server stores the content, which is to be sent to the user by means of a multicast transmission. In the UMTS the Multimedia Broadcast/Multicast Service, MBMS, is provided. The task of the server is fulfilled by means of the Broadcast Multicast-Service Centre MB-SC, which is an MBMS data source. The MBMS data may be scheduled in the MB-SC, for example for transmission to the users every hour. It offers interfaces to a content provider, so that said content provider can request data delivery to the users. The BM-SC may authorise and charge content providers. Detailed description of the BM-SC is given in 3GPP TR 23.846 "Multimedia Broadcast/Multicast Service; Architecture and Functional Description".

In the wireless networks the end users are characterized by a variety of mobile terminals with a wide range of capabilities like for example display size. In current multicast solutions the source of data, like the server adapts the transmission conditions to the slowest receiver. This method is not sufficient when clients are charged for the service and for the bearer that is used for the service. In addition different radio-access networks make multiple maximum-access link speeds available. Because of the physical characteristics of the cellular radio networks, the quality and, thus, the data rate of ongoing connection will vary contributing to the heterogeneity problem.

Receiver-Driven Layered Multicast, S. McCanne, V. Jacobson and M. Vetterli, "Receiver-driven layered multicast", In Proc. of ACM SIGCOMM'96, pages 117-130, Stanford, Calif., August 1996, is a well-known technology in the Internet and it solves some of the above-mentioned problems. Several improvements have been proposed. The basic idea is as soon as more capacity becomes available, the receiver changes a subscription level by joining to an additional multicast group and adapts the stream to the actual network conditions. The server provides a number of quality levels, and the member decides which quality level fits to his current network condition. In other words, if there is an unsatisfied client with the offered quality, a change to another group with the requested quality is performed. The user gets separately information only about the additional group.

Actually, receiver-driven sub-grouping can deal with changing network conditions, keeping the subjective quality at a reasonable level.

The clients need total knowledge on available multicast groups in order to make correct decision on which group to join. Moreover, offering different content in various groups need to be announced in the usual way using for example a Session Application Protocol SAP. In case of streaming applications, several coded variants of the same video clip are stored on a content server and send out to different multicast groups. Clients can then choose the variant that they prefer or that their terminals are able to receive and to process. The disadvantage is that with the usual way of announcement separated information about a multicast group is distributed. There are no possibilities to distribute information about dependences between the simple multicast groups. The users do not have any possibilities to change to another kind of content without performing an end-to-end protocol interaction. Therefore the problem is basically that there is no dynamic or flexible mechanism within the network to let clients zap fast between channels with different content. Further problem of the current solutions is that the user cannot easy hop between different groups with different quality levels.

SUMMARY AND DESCRIPTION OF THE INVENTION

It is an object of the present invention to provide a dynamic solution for performing hopping between multicast groups and zapping between channels within a telecommunication network. The invention is embodied in a method as disclosed in claims 1, 15 and 17. Advantageous embodiments are described in the dependent claims.

The method of claim 1 discloses a solution for performing a flexible multicast of multicast data to a multicast group within a telecommunication system. The multicast data is provided by a broadcast/multicast server and transferred to the users registered to the multicast group by means of channels. The flexible multicast is performed in the following way. Multi-channel multicast groups (B1,B2, . . . ) are provided, wherein each multi-channel multicast group is configured and uniquely identified by means of a first identifier. Each multi-channel multicast group offers at least one channel wherein the channel transports content and is uniquely identified by means of a second identifier. An announcement multicast group (A) is provided for informing about availability and configuration of at least one of the multi-channel multicast groups (B1,B2, . . . ) wherein the user establishes a connection through the telecommunication network and the announcement multicast group (A) is announced to the user. The user joins the announcement multicast group (A) and the first identifier is used to between multi channel multicast groups (B1,B2, . . . ) and the second identifier is used for zapping between the channels.

The present invention makes it possible to zap between channels within one multi-channel group and to hop between different multi-channel groups. The proposed solution is either client driven, it means the user decides to change the multicast group or it is server driven, it means the operator forces the user to move group members from one multicast group to another group.

The advantage of the invention is a guarantee of a better service. Instead of delaying the whole group, since multicast can only work if the slowest user equipment is considered, the slow user equipment can be treated specially.

In the following some examples are given for possible motivations for hopping between groups.

Hopping between multicast groups can be performed in case the clients are unsatisfied with the offered quality. Because the user is informed by means of the announcement multicast group (A) about the content quality served by the other multi-channel multicast group, the user can decide to change the multi-channel multicast group in order to receive the requested content quality.

Another example for the motivation for hopping is in case the transmission quality in multi-channel multicast group B1 differs from that in multi-channel multicast group B2, because for example the transmission is mapped on a different radio bearer or in an other radio access system. A source may stream the same content with different codecs on different groups and clients are moved between these groups. The reason for hopping can be also the different cost for using the multi-channel multicast group B1 or B2, for example the clients may choose the cheaper, and service providers may choose the more expensive service.

In case of the server driven method the group hopping is used for load balancing, on this way the service provider wants to control the mapping of users to multi-channel groups.

In a preferred embodiment the hopping between the multi channel multicast groups is performed by means of join-and-leave transactions to and from a multi channel multicast group. This is realised for example by means of the well known Internet Group Message Protocol IGMP protocol.

In an advantageous embodiment of the present invention the configuration of the multi channel multicast group is performed by means of parameters defining different transmission quality, coding method, prise, protection key, reliability, expected jitter or restricted to certain subscriptions.

Further the location dependent information are considered, so that the present invention is advantageous for an intelligent traffic information provisioning, in which the multicast groups are defined per region with its specific parameters like the traffic information, weather or travel direction of the users in order to provide an intelligent traffic guidance. The present invention is used to generate hierarchies in the group management, which leads to better sub-grouping. For instance, the user expresses general interest in particular information, like weather, travel, sport and the network cares about location dependent subgroup management. In order to provide full functionality including support of different service quality levels, with different tariffs for example business and student tariff, a clever combination of client driven and server driven sub grouping is proposed.

In one embodiment of the present invention the joining to the multi channel multicast group is user-driven. It means the user takes the decision to hop between the multi channel multicast groups taking into consideration relevant parameters, like for example the subscription, the expected transmission quality depending on the user terminal or the costs of the transmission.

In other embodiment of the present invention the joining to the multi channel multicast group is server driven with a mechanism for forcing the users to hop between the multi channel multicast groups. With this solution the operator can control the network resources.

In a preferred embodiment of the invention the first identifier is a multicast address of a multi channel multicast group. This address is used to join or leave a multi channel multicast group. The second identifier depends on the used access network. For example the identification of the access bearer can be used. Another example is an identifier identifying the multicast data flow transported on one access bearer. In this case each channel is mapped on the same time slots, when time-multiplexing is used. Of course also a combination of both is possible and advantageous. For example in case four channels are included in a multi-channel group, then a base station may multiplex first two channels on one access bearer and the second two channel on a second access bearer. Within an access bearer the channels are identified by means of the identifier identifying the multicast data flow transported on one access bearer. A terminal has to switch either between access bearers or between time-slots within one access bearer in order to zap between channels.

In a preferred embodiment of the invention the announcement multicast group A is sent regularly, in certain intervals or continuously. It depends on the implementation considering the aspect how often the users are to be informed about the available multi channel multicast groups.

The channels can be described by means of some further parameters. These parameters are sent by means of the announcement multicast group (A) or they can be included in each multi-channel multicast group. The second the receiver needs to scan multi-channel multicast group to retrieve the detailed information on a channel.

Further the present invention proposes a list of multi-channels groups not yet established but for which users have already shown interest. Said list is multicasted to the users by means of the announcement multicast group A, so that the user can consider to use the proposed multicast group by informing the multicast server. The multicast server uses this information for taking a decision about an establishment of a new multicast group in case a reallocation of the resources is to be performed. A certain threshold level of users interest is taken into account by the decision. The new established multi channel multicast group is announced to the users to join them to the new multicast group. When the last user of the multi channel multicast group leaves, said group is dissolved. The described mechanism of establishment or release of a multicast group results in transient groups with dynamic membership, which guarantees a high dynamics and flexibility of the present invention.

Further it is proposed to have a system adapted to perform the flexible and dynamic hopping between the multicast groups and zapping between the channels within one multicast group according to claim 15. The system has means for announcement of the announcement multicast group (A) to the users. This feature can be implemented in a multicast/ broadcast server. Further the system has means for joining the user to the announcement multicast group and also means for joining the user to the multi channel multicast group using the first identifier. Said means are also used when a user is to be forced to change a multicast group. Means for zapping the user between the channels using the second identifier are provided for zapping between channels.

Further according to claim 17 it is proposed to have a receiver like for example a mobile terminal adapted to perform the multicast flexible and dynamic hopping between the multicast groups and zapping between the channels within one multicast group. The receiver has means for receiving the announcement multicast group (A). Further the receiver has means for joining the user to the announcement multicast group for example an IGMP message. Means for joining the user to the multi channel multicast group using the first identifier and means for zapping between the channels using the second are provided for changing the multi-channel multicast group or a channel within said group.

In an advantageous embodiment of the present invention the receiver has means for tuning the receiving data wherein the second identifier is used to select the appropriate bearer on which the channel is being transmitted in order to switch between access bearers.

Further the receiver has means for de-multiplexing the channels according to the second identifier, which identifies the multicast data flow transported on one access bearer.

In the following a detailed description of the invention is given.

FIG. 1: Presentation of multi-channel multicast group with different channel quality and of the announcement multicast group, FIG. 2: An embodiment of the present invention with time sequence of the exchanged messages.

Packet-switched domain in a UMTS network and in addition the radio networks and the IP multimedia subsystem, As proposed in the present invention an announcement multicast group is to be introduced for informing the users about the availability and the configuration of the available multi-channel multicast groups. The announcement multicast group A can convey different information. However in order to recognise the different multi channel multicast groups a list of the available multi channel multicast groups described with B1, B2, . . . are to be provided. Each multi channel multicast group is to be identified by means of a multicast address, which is required in case a user decides to join a multi channel multicast group for receiving the multicast data sent on this group. The multi channel multicast group is specified by means of different configuration parameters, like for example audio-visual quality level, coding, price, protection, reliability, expected jitter or restricted to certain subscriptions.

In the following an example of the content of the announcement multicast group A is given.

B1: MCAddr1, 768 kbps, MPEG4, 2ε, protection key 1, . . .
B2: MCAddr2, 384 kbps, MPEG4, 1ε, protection key 2, . . .
B3: MCAddr3, 64 kbps, QuickTime, free, free access/no protection, . . .

It means the announcement multicast group A announces three multi channel multicast groups B1, B2, B3 identified by means of a corresponding multicast address, MCAddr1, MCAddr2, MCAddr3. Further each of the multi channel multicast group has different quality; B1 transfers data with 768 kbps, B2 with 384 kbps and B3 only with 64 kbps. Two coding methods are applied, MPEG4 and QuickTime. The cost for usage of the multi channel differs between 2 and no costs. Also the protection of the data is performed in different ways depending on the protection key.

However these are merely examples. The various multichannel groups can also differ only in a subset of said parameters. For example different but overlapping set of channels, with the same audio-visual quality level and coding but with different protection allow access to a certain multi-channel group only to the owners having a specific protection key. In this example, hopping between multi-channel groups is only possible between those for which a particular user has the protection key.

The multicasting of the announcement multicast group A is repeated regularly, in certain intervals or continuously. It depends on the implementation and on the fact how often the users should be informed about the available multi-channels. The propagation of the announcement multicast group A can be realised by means of the Session Announcement Protocol SAP, Mark Handley. SAP: Session Announcement Protocol. Request for Comments 2974, Internet Engineering Task Force, October 2000). The user receives the announcement multicast group message after attaching to the network. The message includes the multicast address of the announcement multicast group so that the user can register to the announcement multicast group in order to receive regularly information concerning said group. The joining of the user to the announcement multicast group can be also realised by means of an automatic subscription via the user subscription. It means the user is automatic subscribed to the announcement multicast group (A) after attach to network using information stored in his subscription being administrated in a central data base, like for example the Home Location Register HLR. Said information is used to perform a join operation for each pre-subscribed multicast group after a user is attached to the network. Since the user receives frequently information about the available multicast groups by means of the announcement multicast group the user can join and leave a multicast group during an established connection.

Additionally the network operator can provide further information for moving users from one multi channel multicast group to other. The information can be for example that all users, who have a Subscription Bronze, which describes the level of the accessible service, should move from the multi channel multicast group B1 to the multi channel multicast group B3. The reason for the moving can be that the multi channel multicast group B1 offers a higher transmission bandwidth, which is foreseen for the users with a Gold Subscription. This kind of information is transmitted on the announcement multicast group A, so that the user can take this information into consideration by choosing a multicast group.

There are different motivations for moving between the multi channels groups. However the motivation can be manifold. It can be the visual or aural quality of the content (higher or lower resolution), different bitrate, delay, jitter, reliability and protection and of course all possible combinations of these. The decision can be met by the user, who for example move to a multi channel multicast group offering the requested service on lower cost.

Further the motivation to hop the users between the multi channel multicast groups can come from the operator/server in order to administrate the radio resources. The network operator can force clients with terminals with low resolution to move to a multi channel multicast group, which is sending the requested content with the low resolution, like for example to the multi channel multicast group B3 serving clients interested in 320×240 resolution in order to save the radio resources for terminals with higher resolution.

In case the operator wants to control the allocation of the users in the multi channels groups then a mechanism for forcing the user to hop are to be provided. For example the information on who has to be in which multi-channel multicast group is conveyed to the key server, such that a client who has to move, for example from B1 to B3, gets only the decryption keys necessary for the multi channel multicast group B3 and not longer those for B1.

Hopping between multi-channel multicast groups is realized by means of a mechanism using the so-called join-and-leave transactions for joining and leaving a multicast group on which a particular multi-channel group is being transmitted. Usually a terminal should first join a new multicast group and then leave an old multicast group to ensure a smooth transition. However, it depends on the terminal capabilities whether a terminal can receive two or more multi-channel multicast groups in parallel or not. If a terminal cannot receive more than one multi-channel group, then it has to leave the old multi-channel multicast group before it joins the new one.

The join-and-leave transactions can be realised by means of a protocol called the Internet Group Message Protocol IGMP. Thus this protocol lets the system know which users currently belong to which multicast group. This information is required by the multicast routers to know which multicast data packet is to be forwarded onto which interface.

The IGMP is a part of the IP layer and the IGMP messages are transmitted in IP data packets. The version 1 of IGMP is described in RFC 1112 "Host extensions for IP multicasting" S. E. Deering, Aug. 1, 1989. RFC 2236 "Internet Group Management Protocol, Version 2" W. Fenner, November 1997 describes the version 2. The IGMP has been developed for IP version 4. In Internet Protocol IP version 6 there is a similar protocol called Multicast Listener Discovery MLD, which is used for the same purpose as the IGMP. The description of the first version of MLD can be found in RFC 2710 "Multicast Listener Discovery (MLD) for IPv6" S. Deering, W. Fenner, B. Haberman, October 1999. However the messages used in MLD correspond to the IGMP messages. In the following the IGMP will be used as an example. Although this should not be restricted to the IGMP.

In principle the IGMP uses two basic messages to fulfil its tasks, the membership report and the membership query message. A multicast router sends a membership query at regular intervals to see if any user still belongs to any group. A user responds to an IGMP query by sending a IGMP report for each group that still contains at least one user. A user joins a group by sending the membership report message. In order to save the transmission resources it is more efficient that the mechanism is controlled by the user. It means the user sends a IGMP membership report in case the user wants to register to a multicast group. The de-registration can be performed by means of an explicit leave message, IGMP Leave. However these messages are not standardised jet.

The result of the join-and-leave transactions is a table with its interfaces having at least one client in a multicast group. The router forwards the received multicast data out the interface, which has at least one member.

In the following a preferred embodiment of the establishment of a new multi channel multicast group is described in more details.

In case a BM-SC server receives a notification from the user that the offered multicast channel does not fulfil the requirements, for example transmission on the channel is too slow or too fast for the user's device, then instead of adapting, in this case by increasing or throttling, the quality of the channels for all members of the multi-channel group according to the requirements of just a few clients, said server decides to open a new multi channel multicast group with a matching quality.

Optionally, list of multi-channels groups not yet established but for which clients have already shown interest can be used in order to chose the matching multi channel multicast group. For this purpose the operator sends a list with the descriptions of multi-channel groups that could be opened by means of the announcement multicast group A.

The BM-SC server operator takes the decision about the establishment of the new multi channel multicast group. In one embodiment the new group is opened only if a certain threshold level is reached, for example if the number of users, which request different quality, is high enough. This requires that for each multi-channel group the BM-SC server keeps track of client notification at least until they are worked off or until they are expired. Vice versa, when the last member of the multi channel multicast group leaves, said group is dissolved. This method results in transient groups with dynamic membership.

By means of the announcement multicast group A the user gets the information about the available multicast groups with the corresponding multicast addresses. Said multicast addresses are used as parameters in the IGMP membership and IGMP leave message to inform the BM-SC about the multi channel multicast group to which the user wants to register or de-register.

The establishment of new multi-channel groups on client notification requires that the BM-SC server counts requests for a certain multi-channel group and keeps track on those group members that are interested. The clients need to tell the BM-SC server their interest identifying details on the multi-channel group. This can be released by means of a so-called multi-channel group interest message containing the details. Said message can be implemented for example as a new message or as an enhancement of the IGMP or MLP or even as a HTTP message. As soon as the counter is above a certain threshold value, set by the operator via a management interface, the BM-SC server establishes a new multi-channel multicast group and informs about its availability on the announcement group A. Optionally the BM-SC informs about the new established multi channel multicast group all clients who have expressed their interest by means of a so-called multi-channel group now available message, which is implemented accordingly to the multi-channel group interest message. The interested users join the new group for example by means of the IGMP membership report message.

The above mentioned principle of the multi channels group with different channels quality is described in the following according to FIG. 1.

The FIG. 1 shows three multi channel multicast groups B1, B2 and B3 and the announcement multicast group A. Each of the multi channel multicast group transmits a number of channels, the multi channel multicast group B1 and B2 transmits four and the multi channel multicast group B3 three channels. Each of the multi channel multicast groups, B1, B2, B3 offers different quality. In FIG. 1 the quality is depicted by means of the lines with different width, for example the multi channel multicast group B1 offers higher Quality of Service QoS level then the multi channel multicast group B3. The content on each multi channel multicast group is the same, the difference is the offered QoS. The user or the operator, depending on the motivation, takes the decision to change between the multi channel multicast groups. As already described the announcement multicast group A carries the information about the multicast groups, about the channels and eventual some others parameters required to perform for example the zapping between the channels within a multi channel multicast group.

In the following the structure of the channels in a multi channel multicast group are described in more details.

In a preferred embodiment of the invention a multi channel multicast group transmits a number of channels carrying multicast data, like content, which are to be multicasted. For example on each channel different television programs as a content can be provided. In the following example, the multi channel multicast group B1 has 10 different television programs. The other multi channel multicast group B2 has 20 channels and B3 3 channels.

B1: 10 channels: CNN, BBC, . . .
B2: 20 channels: CNN, BBC, . . .
B3: 3 channels: ARTE, QVC, . . .

It might even be that on several channels the same content is being transmitted, but just time-shifted to allow jumping in sequential information, for example B1: 10 channels: CNN, BBC, . . .
B2: 20 channels: CNN, BBC, BBC(+10 min), BBC (+20 min), . . .
B3: 3 channels: ARTE, QVC, . . .

The protection of each of the channels may vary. Either the protection key is stated for each channel, for example CNN has none protection, BBC can be protected with the protection key 1, or the user has some protection keys stored on its device and simply tries to get access to the content of a particular channel. This works in a similar way like with the pay TV in Germany today. The content is decoded, when a protection key is available, otherwise only noise is seen.

In other embodiment of the present invention the detail information on the channels is included in each multi-channel group. However in this case a terminal needs first to scan a multi-channel group and retrieve the detail information of said multi-channel group before a certain channel of said multi-channel group can be accessed.

In the following the zapping between the channels within a multi channel multicast group is described.

As already mentioned each multi-channel multicast group B includes at least one channel. If more than one channel is present, general information on the channels is available via the announcement group A. For each channel in the multi-channel group, appropriate further information on how to receive the channel must be transmitted. Said further information needed to zap between the channels is preferably transmitted on each multi-channel multicast group. Of course this information can also be included for each multi-channel group B in the announcement group A. The further information describing the channels depends on the used access system. For example each channel of a multi-channel group can be mapped on different access bearer. Each access bearer is uniquely identified by means of the second identifier. For example in the mobile networks the bearer identifier can be used as the second identifier and in the SONET networks the frame class. In order to zap between channels a terminal tunes the receiving data and uses the second identifier to select the appropriate bearer on which the channel is being transmitted in order to switch between access bearers.

Alternatively, the second identifier identifies the multicast data flow transported on one access bearer. Said identifier is provided besides the multicast address of the multi-channel group. In this case the data is transmitted on the same access bearer and the receiver has to de-multiplex the channels by means of the second identifier. For example if four channels are included in a multi-channel group, then all four are multiplexed into one byte stream on a single access bearer. Each of the four channels has a unique second identifier. The transmission is usually realized by means of time multiplexing, but other multiplex schemes are feasible as well. In the example of a time-multiplexing with fix time-slots, each channel is always mapped on the same time-slot and subsequently de-multiplexed. In this example the second identifier for each channel is the time slot number on which the channel is mapped. A terminal has to switch between time-slots in order to zap between channels. The switching is the task of a transceiver, for example a first channel is mapped on time slot 2 and a second channel is mapped on time slot 4, and the terminal is currently tuned only to the first channel it means the time slot 2 is accessed, in case the channel has to be changed from the first channel to the second channel, the transceiver of the mobile terminal is to be informed to deliver the content from time slot 4 instead of time slot 2.

Other possibility is the combination of the above two methods. In this method the MBS server introduces the second identifier identifying the multicast data flow transported on one access bearer. Said second identifier is used by the Radio Network Controller RNC or by the base station to map the channels onto different access bearers. In this case the RNC/base station informs the BM-SC about the bearers and the BM-SC includes this information into the announcement multicast group (A). For example in case four channels, 1-4, are included in a multi-channel group B, then the base station/RNC may multiplex channel 1 and 2 on one access bearer and channel 3 and 4 may be multiplexed on a second access bearer. A terminal has to switch either between access bearers or between time-slots within one access bearer in order to zap between channels.

In the following the method steps of an embodiment of the present invention is described in respect to FIG. 2.

Figure 2:
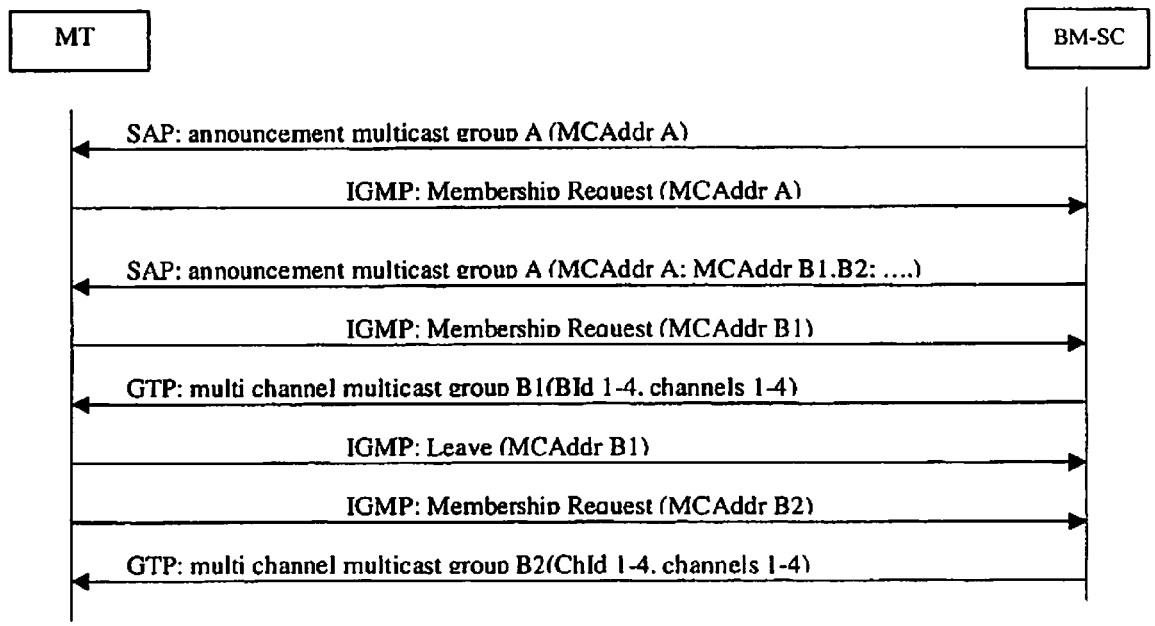

The FIG. 2 shows the time sequence of the sent messages between the BM-SC server and the user, Mobile Terminal MT. An arrow indicates the direction of the sent message. Above a line the name of a message with parameters is depicted.

In the first step the BM-SC announced the availability of the announcement group A by means of a session announcement mechanism, like for example the Session Announcement Protocol SAP, SAP: announcement multicast group A (MCAddr A). In this embodiment said message carries as parameters the multicast address of the announcement multicast group A, MCAddr A, so that the user can use said multicast address to register to the announcement multicast group in order to receive the information transmitted on said group. For this purpose in the second step the user MT joins the multicast group on which the announcement group is being transmitted, IGMP: Membership Request (MCAddr A). In the third step the user retrieves the information on available multi-channel multicast groups via the announcement group, SAP: announcement multicast group A (MCAddr A; MCAddr B1,B2; . . . ) with some further parameters, which are the multicast addresses of the multi channel multicast groups, MCAddr B1,B2; . . . . These addresses are used by the user to register to a matching multi channel multicast group for receiving the content, the user is requesting for. The SAP: announcement multicast group A message is shown only once, however as described above this message can be sent periodically, it depends on the operator's implementation. The user MT joins the multicast group on which multi-channel group B1 is transmitted, IGMP: Membership Request (MCAddr B1). In the example of the multi channel multicast group all channels are mapped on different bearers. The content of the multicast group is sent by means of the GPRS Tunnelling Protocol GTP with the identification parameters of the in the multi channel multicast group included channels. In this example the channels, channels 1-4 are identified by means of the access bearer, BId 1-4, which are sent as the parameters of the message, GTP: multi channel multicast group B1(BId 1-4, channels 1-4). The user MT can zap between channels by selecting different bearers using the identification of the access bearer. In dependence of the terminal capabilities, also multiple channels can be retrieved in parallel, for example for performing the picture in picture mode.

In case the user MT switches from radio access UMTS to radio access WLAN, in which a higher bandwidth can be received, then it expects a better QoS. He knows, that the multi channels multicast group B2 offers the required QoS. Therefore the user MT leaves the multicast group that carries the multi-channel group B1 and joins the multicast group that carries the multi-channel group B2. For this purpose the user sends the IGMP: Leave (MCAddr B1) and after that IGMP: Membership Request (MCAddr B2). He knows that in the multi-channel group B2 the channels are time-multiplexed on one bearer. Therefore the channel identification, ChId is used to de-multiplex the channels sent on one bearer, GTP: multi channel multicast group B2(ChId 1-4, channels 1-4). The terminal can zap between channels by selecting different time-slots being identified by means of the channel identifier ChId.

The description of the invention disclosure is based on the networks GPRS or UMTS. However, it should be understood that the same mechanisms could be applied for any telecommunication network wanting to provide a flexible and dynamic multicast with a possibility of channel zapping. The solutions described in this invention merely cover some examples of possible information exchange. It should be understood that other messages may be used as carrier for the same or different information.

The invention claimed is:

1. A method for flexible multicast of multicast data to a multicast group within a telecommunication system, wherein the multicast data is provided by a broadcast/multicast server and transferred by means of channels to terminals registered to the multicast group, said method comprising the steps of:
    establishing multi-channel multicast groups, wherein each multi-channel multicast group is configured and uniquely identified by means of a first identifier;
    offering, for each multi-channel multicast group, at least one channel, wherein a channel is uniquely identified by means of a second identifier;
    providing an announcement multicast group for informing about availability and configuration of the multi-channel multicast groups;
    wherein the announcement multicast group is announced to said terminals and each said terminal can join the announcement multicast group in order to be informed regularly about the available multi-channel multicast group, wherein the first identifier is used to join each said terminal to the multi channel multicast group and to hop between multi channel multicast groups, wherein the hopping is performed by means of a join-and-leave transaction to or from a multi-channel multicast group; and,
    wherein the second identifier is used for zapping between the channels.

2. The method according to claim 1, wherein the configuration of the multi-channel multicast group is performed by means of parameters defining different transmission quality, location dependent information, coding method, price, protection key, reliability, expected jitter or restricted to certain subscriptions.

3. The method according to claim 1, wherein joining and leaving to and from the multi-channel multicast group is user-driven and the user takes the decision to hop between the multi channel multicast groups.

4. The method according to claim 1, wherein joining and leaving to and from the multi-channel multicast group is server driven with a mechanism controlled by the server.

5. The method according to claim 1, wherein the first identifier is a multicast address of a multi-channel multicast group.

6. The method according to claim 1, wherein the second identifier depends on the access network.

7. The method according to claim 1, wherein the second identifier is the access bearer or an identifier identifying the multicast data flow transported on one access bearer or a combination of both.

8. The method according to claim 1, wherein some further parameters describing a channel are sent by means of the announcement multicast group or are included in each multi-channel multicast group.

9. The method according to claim 1, wherein the announcement multicast group is sent regularly, in certain intervals or continuously.

10. The method according to claim 1, wherein a list of multi-channel multicast groups not yet established but for which terminals have already shown interest is multicasted to the terminals by means of the announcement multicast group.

11. The method according to claim 10, wherein the new multi-channel multicast group is established if a certain threshold level of terminals interest is reached.

12. The method according to claim 1, wherein a new multi-channel multicast group is established and announced to the terminals.

13. The method according to claim 1, wherein the multi-channel multicast group is dissolved when the last terminal leaves said group.

14. A system adapted to perform a flexible multicast of multicast data to a multicast group within a telecommunication system, wherein the multicast data is provided by a broadcast/multicast server and transferred by means of channels to users having terminals registered to the multicast group, said system comprising:
    means for establishing multi-channel multicast groups, wherein each multi-channel multicast group is configured and uniquely identified by means of a first identifier;
    means for offering, for each multi-channel multicast group, at least one channel wherein a channel is uniquely identified by means of a second identifier;
    means for providing an announcement multicast group for informing about availability and configuration of the multi-channel multicast groups;
    means for announcement of the announcement multicast group to the terminals in order to be informed regularly about the available multi channel multicast group;
    means for joining the said terminals to the announcement multicast group;
    means for joining any of said terminals to the multi-channel multicast group using the first identifier and means for hopping between multi-channel multicast groups by means of a join-and-leave transaction to or from a multi-channel multicast group; and,
    means for zapping the terminals between the channels using the second identifier.

15. The system according to claim 14, wherein the system forces a terminal to change the group and/or to zap between the channels.

16. A receiver, in a terminal, adapted to receive multicast data corresponding to a multicast group within a telecommunication system, wherein the multicast data is provided by a broadcast/multicast server and transferred by means of channels to terminals registered to the multicast group, wherein:

multi-channel multicast groups are established, wherein each multi-channel multicast group is configured and uniquely identified by means of a first identifier;

each multi-channel multicast group offers at least one channel wherein a channel is uniquely identified by means of a second identifier; and, an announcement multicast group is provided for informing about availability and configuration of the multi-channel multicast groups;

said receiver comprising:

means for receiving the announcement multicast group;

means for joining the terminal associated with said receiver to the announcement multicast group in order to be informed regularly about the available multi channel multicast group;

means for joining the terminal associated with said receiver to the multi channel multicast group using the first identifier;

means for hopping between multi channel multicast groups by means of a join-and-leave transaction to or from a multi channel multicast group; and, means for zapping between the channels using the second identifier.

17. The receiver according to claim 16, wherein said receiver has means for tuning the receiving data wherein the second identifier is used to select the appropriate bearer on which the channel is being transmitted in order to switch between access bearers.

18. The receiver according to claim 16, wherein said receiver has means for de-multiplexing the channels according to the second identifier, which identifies the multicast data flow transported on one access bearer.

\* \* \* \* \*

UNITED STATES PATENT AND TRADEMARK OFFICE
CERTIFICATE OF CORRECTION

| | | |
|---|---|---|
| PATENT NO. | : 7,558,262 B2 | Page 1 of 1 |
| APPLICATION NO. | : 10/532323 | |
| DATED | : July 7, 2009 | |
| INVENTOR(S) | : Tonjes et al. | |

It is certified that error appears in the above-identified patent and that said Letters Patent is hereby corrected as shown below:

In Column 5, Line 37, delete "subsystem," and insert -- subsystem. --, therefor.

Signed and Sealed this

Twenty-ninth Day of December, 2009

David J. Kappos
*Director of the United States Patent and Trademark Office*